United States Patent [19]

Runyan et al.

[11] Patent Number: 4,967,460

[45] Date of Patent: Nov. 6, 1990

[54] BLIND HOLE BUSHING AND BEARING REMOVER

[76] Inventors: Kenneth D. Runyan, 24149 Birch Terr., Willits, Calif. 95490; Jerry W. Nelson, 141 Ellis La., Ukiah, Calif. 95482

[21] Appl. No.: 363,778

[22] Filed: Jun. 9, 1989

[51] Int. Cl.[5] .............. B23P 19/04

[52] U.S. Cl. .............. 29/252

[58] Field of Search .............. 29/252, 263, 264, 265, 29/282, 255; 137/246.22, 315

[56] References Cited

U.S. PATENT DOCUMENTS

| | | | |
|---|---|---|---|
| 4,280,274 | 7/1981 | Filer | 29/263 |
| 4,507,837 | 4/1985 | Hinkle | 29/265 |
| 4,586,229 | 5/1986 | Pendola | 29/252 |
| 4,724,608 | 2/1988 | Parrott | 29/264 |

*Primary Examiner*—Robert C. Watson

[57] ABSTRACT

A tool for the extraction of bushings, bearings or other similar objects pressed into blind holes.

The preferred embodiment of the invention consists of a cylinder tube 1, with a blind head 2 attached, and sealed by blind head seal 5. The piston 3 is joined to the rod 4 which travels through the rod hole 12 and is sealed by the piston seal 6 in the inner diameter of cylinder tube 1.

The blind hole bushing and bearing remover is used by installing the appropriate nose piece (ball type, bushing-/bearing removal nose piece 8; or self-threading, tapered type, bushing/bearing removal nose piece 17) into the bushing or bearing to be removed. Pushing media (grease) is introduced under pressure, and travels through check valve (grease fitting) receptacle and linear hole 7, thus moving piston 3, and extending rod 4 through the appropriate nose piece. When rod 4 makes contact with the bottom of the blind hole, the nose piece then contacts/engages the bushing/bearing resulting in a lifting force on the bushing/bearing, which lifts the bushing/bearing from the blind hole.

3 Claims, 2 Drawing Sheets

BLIND HOLE BUSHING AND BEARING REMOVER

This is a continuation-in-part of application Ser. No. 250,231 filed Sept. 28, 1988.

BACKGROUND FIELD OF INVENTION

This invention relates to the removal of various sized bushings and bearings that are pressed into blind holes.

DESCRIPTION OF PRIOR ART

Heretofore, bushings and bearings have been removed from blind holes using mechanical pullers which require fingers/split collets attached to a threaded rod, to be rotated against a base support, or fingers/split collets attached to a slide hammer arrangement in order to effect removal. Past technology concerning the removal of a bushing or bearing from blind holes is time consuming, requires more space to operate, and requires more physical effort by the user, thus rendering past methods less effective. Mechanical fingers that are used as traditional bearing or bushing removers, hook the inner edge of the wall of the bearing or bushing and have a tendency to wear and become ineffective. This renders the fingers useless and requires their replacement before the bearing or bushing can be removed. For smaller diameter bearings or bushings with thinner walls, the mechanical fingers that protrude through the inner diameter of the bearing or bushing must then be subjected to shock (slide hammer) to affect the fingers to spring out and grasp the edge of thin bearing or bushing walls, without an aid to support the center of the fingers. This method provides limited entry area for the fingers, and allows minimum surface area for the pulling operation and is thus inefficient.

The blind hole bushing and bearing remover enables various sized bushings and bearings to be removed from blind holes safer, quicker and easier. Time of the job and costs to the user can both be greatly reduced using the blind hole bushing and bearing remover.

OBJECTS AND ADVANTAGES

Accordingly, several objects and advantages of the blind hole bushing and bearing remover are that; blind hole bearings or bushings may be removed in more confined areas with greater ease and speed, at a lower cost to the user, and with less risk.

Further objects and advantages of this invention will become apparent from a consideration of the drawings and the ensuing description.

DRAWING FIGURES

Figure 1:
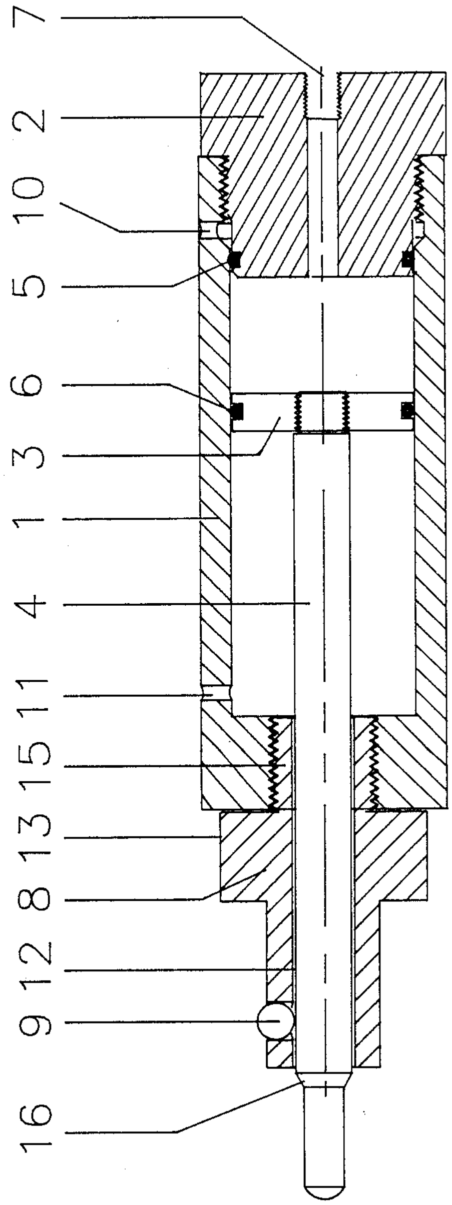

FIG. 1 shows a cut-away side view of the blind hole bushing and bearing remover according to the preferred embodiment of the invention with ball type bushing/bearing removal nose piece 8 installed and rod 4 partially extended.

Figure 2:
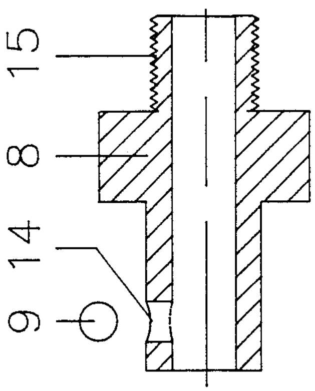

FIG. 2 shows a cut away side view of the ball type, bushing/bearing removal nose piece 8 with ball 9 above ball hole 14, and with nose piece attaching threads 15.

Figure 3:
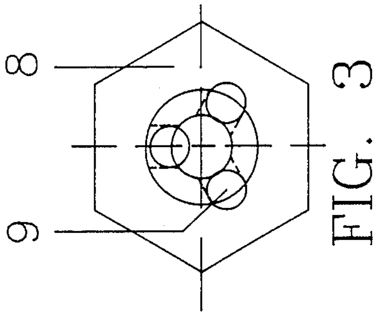

FIG. 3 shows a nose-end view of the ball type, bushing/bearing removal nose piece 8 with three ball bearings 9 installed.

Figure 4:
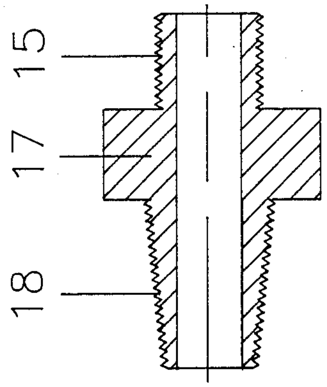

FIG. 4 shows a cut away side view of the self-threading, tapered type, bushing removal nose piece 17, showing nose piece attaching threads 15, and self-threading, tapered, threaded end 18.

Figure 5:
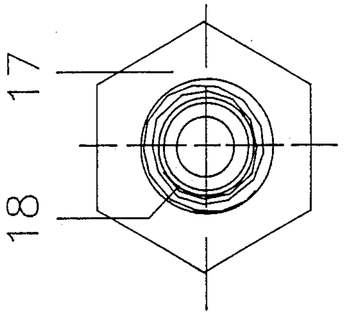

FIG. 5 shows a nose-end view of the self-threading, tapered type, bushing removal nose piece 17, from the perspective of the self-threading, tapered, threaded end 18.

DRAWING REFERENCE NUMERALS 1 cylinder tube
2 blind head
3 piston
4 rod
5 blind head seal
6 piston seal
7 check value (grease fitting) receptacle and linear hole
8 ball type, bushing/bearing removal nose piece
9 ball
10 media (grease) escape hole
11 safety vent
12 rod hole
13 driver wrench end
14 ball holes
15 nose piece attaching threads
16 rod minor to major diameter chamfer
17 self-threading, tapered type, bushing removal nose piece
18 self-threading, tapered, threaded end

BLIND HOLE BUSHING AND BEARING REMOVER—DESCRIPTION

FIG. 1 shows a cut-away view of the assembled blind hole bushing and bearing remover with the ball type, bushing/bearing removal nose piece 8 installed.

The preferred embodiment of the invention consists of a cylinder tube 1 with a blind head 2 attached, and sealed by blind head seal 5. The piston 3 is joined to the rod 4 which has a rod minor to major diameter chamfer 16 at the nose piece end. Rod 4 travels through the rod hole 12 and is attached to piston 3, which is sealed by piston seal 6 on the inner diameter of cylinder tube 1. A media (grease) escape hole 10 is located at the blind head 2 end of cylinder tube 1, and a safety vent hole 11 is located on the nose piece attaching threads 15 end of the cylinder tube 1. Check value (grease fitting) receptacle and linear hole 7 is located in blind head 2.

FIG. 2 displays a ball type, bushing/bearing removal nose piece 8. The ball 9 is shown above the ball hole 14 where they are installed. The ball type, bushing/bearing removal nose piece 8 is threaded into cylinder tube 1 at the nose piece attaching thread end 15.

FIG. 4 displays a self-threading, tapered type bushing removal nose piece 17. This nose piece is threaded into cylinder tube 1 at the nose piece attaching threads 15 end. The self-threading, tapered, threaded end 18 is installable in the bushing to be removed.

BLIND HOLE BUSHING REMOVER—OPERATION

The blind hole bushing/bearing remover shown in FIG. 1, enables various sized bushings and bearings to be removed from blind holes more quickly and easily. It is a highly reliable, safe, and easy to use tool.

The preferred embodiment consists of a cylinder tube 1, with a blind head 2 attached, and sealed by blind head seal 5. The piston 3 is joined to the rod 4 which travels through the rod hole 12 and is sealed by the piston seal 6 in the inner diameter of cylinder tube 1.

Pushing media (grease) is introduced under pressure and travels through check value receptacle and linear hole 7 creating positive pressure on the blind head 2 side of the piston 3, causing the piston 3 and rod 4 assembly to move through cylinder tube 1. The rod 4 passes through the appropriate nose piece, which is engaged in the bushing or bearing to be removed from a blind hole, making contact with the bottom of the blind hole, thus lifting the bushing or bearing out.

FIG. 2, displays a ball type, bushing/bearing removal nose piece 8. The rod 4, when retracted into cylinder tube 1, allows the ball bearings 9, to collapse to the appropriate diameter that will fit the inner diameter of the bushing/bearing to be removed. When said nose piece is installed into the bushing/bearing to be removed, and pushing media (grease) is applied under pressure, piston 3 moves and rod 4 is extended. This causes the ball bearings 9 to pass over the rod minor to major diameter chamfer 16 thus making the ball bearings 9 circumference larger than the inner circumference of the bushing/bearing being removed, forcing the balls out in a locked position. As the rod 4 continues to extend, it makes contact with the bottom of the blind hole, creating a lifting force. The nose piece then contacts/engages the bushing/bearing, which lifts the bushing/bearing out of the blind hole.

FIG. 4 displays a self-threading, tapered type bushing removal nose piece 17. The self-threading, tapered, threaded end 18 is threaded into the soft bushing being removed, forming a bond with said bushing. Pushing media (grease) is then introcduced under pressure through check value (grease fitting) receptacle and linear hole 7, thus moving piston 3 and extending rod 4. As the rod 4 continues to extend, it makes contact with the bottom of the blind hole, and lifts the bushing out.

CONCLUSION, RAMIFICATIONS AND SCOPE OF INVENTION

While the above description contains many specificities, the reader should not construe these as limitations on the scope of the invention, but merely as exemplifications of preferred embodiments thereof. Thus the reader will see that the blind hole bushing and bearing remover is a highly reliable, safe, and easy to use tool used for the quick and complete removal of blind hole bushings and bearings. The blind hole bushing and bearing remover may be used not only for bushings and bearings, but for any application where a bushing, bearing, or similar type object needs to be removed from a blind hole. Those skilled in the art will envision many other variations of the blind hole bearing and bushing remover. For example, skilled artisans will readily be able to change the dimensions and shapes of the various embodiments. They might also be able to make the blind hole bushing and bearing remover from alternative materials. Accordingly, the reader is requested to determine the scope of the invention by the appended claims and their legal equivalents, and not solely by the examples which have been given.

We claim:

1. An extraction apparatus for extracting blind hole bushings, blind hole bearings, and similar devices comprising:

a main body having a cylindrical tube with an outer surface and an inner surface, said inner surface being formed about a central bore along the longitudinal axis of said tube, said tube having a first open and a second open end, a first set of screw threads formed in said inner surface and extending inward away from said first end, a second set of screw threads formed in said inner surface of said bore and extending inward away from said second end, a first escape passageway inward away from said first end and said first set of screw threads, said first passageway connecting said inner surface to said outer surface of said tube, and a second escape passageway inward away from said second end and said second set of screw threads, said second passageway connecting said inner surface with said outer surface of said tube;

a piston assembely disposed within the central bore between said first end and said second end of said tube, said assembly being substantially co-axial with the longitudinal axis of said tube, said assembly having a head, said head having a circumferential groove and a piston seal disposed within said groove, said piston seal communicating with said inner surface of said tube, and a rod aligned substantially co-axially with the longitudinal axis of said tube, said rod extending from said head along the longitudinal axis of said tube and exiting said tube through said second end of said tube;

a blind head cap for sealing said first end of said tube, said cap having a first end surface, a second end surface, and a generally cylindrical shaped outer surface extending between said first end surface and said second end surface, said outer surface having a circumferential groove and a cap seal disposed within said groove, said cap seal communicating with said inner surface of said tube, and with outer screw threads which matingly engage with said first set of screw threads of said tube, and said cap having a central passageway therethrough substantially co-axial with the longitudinal axis of said tube connecting said first end surface to said second end surface, an inner surface of said cap surrounding said central passageway having interior screw threads formed therein which extend inward away from said first end surface; and a generally cylindrical-shaped nose piece having a first end face, a second end face, and an axial bore substantially co-axial with the longitudinal axis of said tube, said axial bore being shaped to receive said rod therethrough and connecting said first end face and said second end face, and a non-uniform outer surface having at least a first section and a second section, said first section being adjacent to said first end face and having screw threads formed therein which matingly engage with said second set of screw threads of said tube, said second section being shaped to fit within the central cavity of the blind hole bushing-like device to be extracted, whereby upon mating of the corresponding screw threads of both said body and of said cap and of both said body and said nose piece, introduction of pushing media into said body through said central passageway in the direction from said first end surfaces to said second end surface displaces said piston assembly away from said cap.

2. An extraction apparatus as claimed in claim 1, wherein said second section of said nose piece includes a plurality of channels disposed radially about the longitudinal axis of said nose piece, said channels connecting said axial bore of said nose piece to said outer surface of said nose piece, each of said channels containing a ball, each said ball movable along the axis of each said channel.

3. An extraction apparatus as claimed in claim 1, wherein said second section adjacent to said second end face of said nose piece tapers with increasing diameter from said second end face toward said first end face, said tapered surface having screw threads formed therein for engaging the inner surface of the central cavity of the blind hole bushing-like device to be extracted.

* * * * *